(12) United States Patent
Walker et al.

(10) Patent No.: US 7,477,825 B2
(45) Date of Patent: Jan. 13, 2009

(54) METHOD AND SYSTEM FOR RELEASING A PLUGGABLE MODULE

(75) Inventors: Harold Y. Walker, Plano, TX (US); Richard L. Bell, Richardson, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/838,145

(22) Filed: Aug. 13, 2007

(65) Prior Publication Data

US 2008/0031577 A1 Feb. 7, 2008

Related U.S. Application Data

(63) Continuation of application No. 10/006,103, filed on Dec. 6, 2001, now Pat. No. 7,255,484.

(51) Int. Cl.
*G02B 6/36* (2006.01)
(52) U.S. Cl. .............................. 385/134; 385/53; 385/88
(58) Field of Classification Search ........................ None
See application file for complete search history.

(56) References Cited

U.S. PATENT DOCUMENTS

| | | | | |
|---|---|---|---|---|
| 6,430,053 B1 * | 8/2002 | Peterson et al. | ............ | 361/728 |
| 6,533,603 B1 * | 3/2003 | Togami | ...................... | 439/372 |
| 6,538,882 B2 * | 3/2003 | Branch et al. | ............... | 361/687 |
| 6,556,445 B2 * | 4/2003 | Medina | ...................... | 361/728 |
| 6,789,958 B2 * | 9/2004 | Ahrens et al. | ................. | 385/92 |
| 6,796,715 B2 * | 9/2004 | Chiu et al. | .................... | 385/53 |
| 6,997,622 B2 * | 2/2006 | Dodds et al. | .................. | 385/92 |
| 7,040,911 B1 * | 5/2006 | Ho et al. | ..................... | 439/352 |
| 2004/0101257 A1 * | 5/2004 | Kruger et al. | ................. | 385/92 |

* cited by examiner

*Primary Examiner*—Sung H Pak
(74) *Attorney, Agent, or Firm*—Workman Nydegger

(57) ABSTRACT

A method and system is disclosed for locking and releasing a module utilized in a transceiver system that includes a plurality of modules in close proximity with one another. The module is generally configured to include a handle with an associated cam formed in a first section of the module. The handle is moveable in a direction to allow the cam to move an associated ejector button integrated with the module in order to release the module from the transceiver system, thereby permitting the module to be efficiently removed from the transceiver system. The module may thus be removed from the transceiver system utilizing the handle. The module may be locked into the transceiver system when the handle is placed in an upward position.

22 Claims, 5 Drawing Sheets

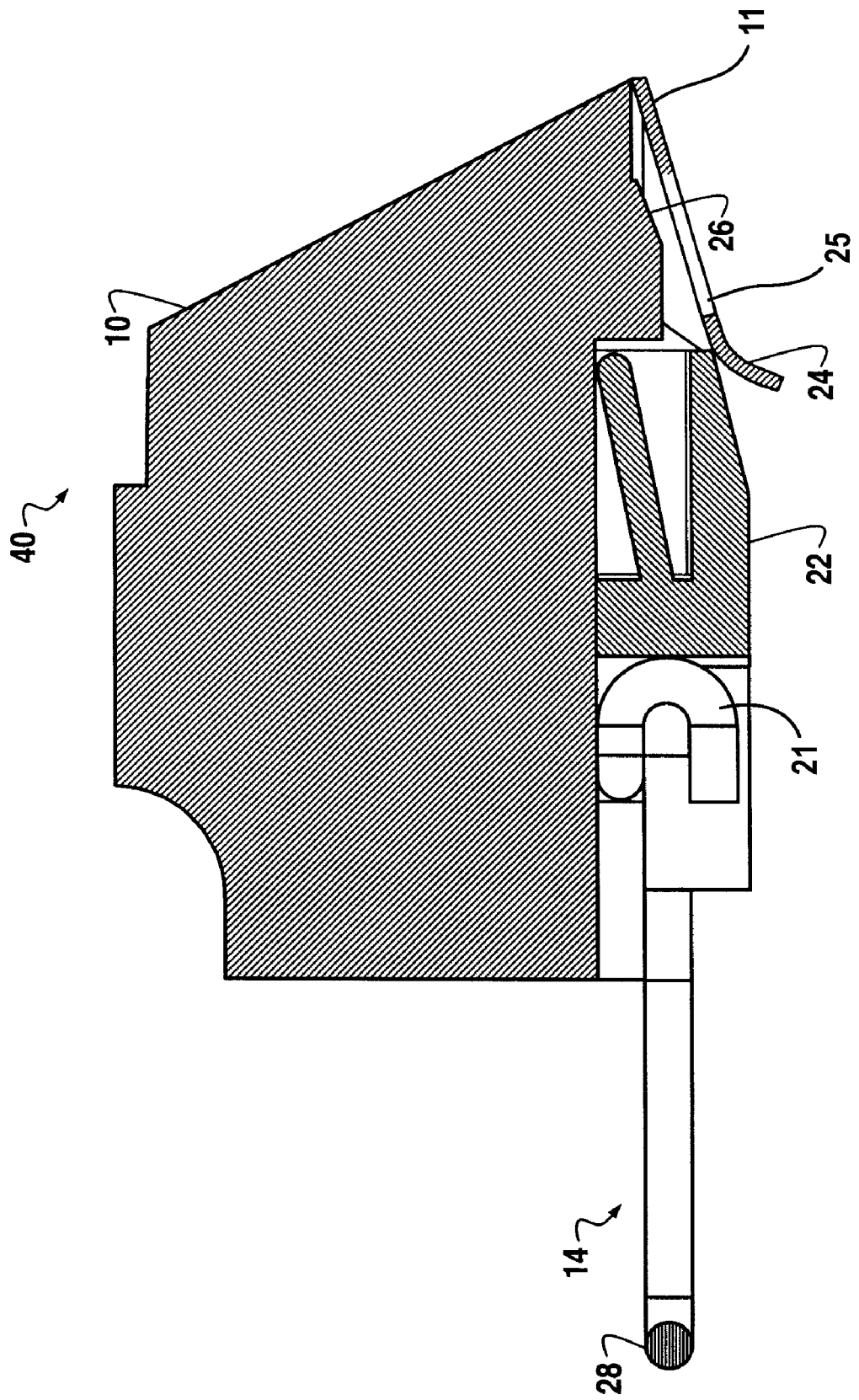

METHOD AND SYSTEM FOR RELEASING A PLUGGABLE MODULE

CROSS-REFERENCE TO RELATED APPLICATIONS

This application is a continuation application of U.S. patent application Ser. No. 10/006,103, filed Dec. 6, 2001, which is hereby incorporated herein by reference in its entirety.

BACKGROUND OF THE INVENTION

1. The Field of the Invention

The present invention generally relates to modules for use in fiber optic and transceiver systems. The present invention also relates to pluggable modules that may be utilized in such transceiver systems. The present invention also relates to transceiver modules and methods and systems for releasing such modules from transceiver systems in which modules are mounted closely to one another.

2. The Relevant Technology

Optoelectronic transceiver modules provide for the bi-directional transmission of data between electrical interfaces and optical data links. Such a module generally can receive electrically encoded data signals for conversion into optical signals, which can then be transmitted over the optical data link. Likewise, such a module can receive optically encoded data signal, which can then be converted into electrical signals and transmitted onto an electrical interface.

Other types of transceiver modules can also be utilized to transmit data. Infrared transceivers, for example, can be utilized for a number of data communication applications. For example, infrared transceiver modules can be utilized to couple laptop computers and personal information managers (PIMs) to IR ports or printers. Also, an increasing number of portable and PIM systems include IR transceiver modules to provide inter-computer and inter-PIM data transfers.

An IR transceiver module typically includes an IR PIN (p-intrinsic-n) diode for a sensor, and an IR light emitting diode (LED) as an emitter. Associated with the sensor is receiver circuitry, and associated with the emitter is transmission circuitry. When the receiver circuitry and transmitter circuitry are integrated together on an integrated circuit (IC), the circuitry can be referred to as a "transceiver" IC or, simply, a "transceiver."

While the sensor, emitter and transceiver of an IR transceiver system can be provided as separate components, it is often desirable to have these components combined into a single package or "module" to save space. Such IR transceiver modules are well known and are commercially available from a number of sources. By combining the various components of the IR transceiver system into a single module, the size or "form factor" of the system can be reduced considerably. Additionally, such modules tend to be more durable and often consume less power then equivalent structures formed with the discrete components.

A transceiver module may be mounted onto one or more circuit card assemblies of a host computer, input/output system, peripheral device, or switch. Therefore, as with all electronic equipment there is a need for a transceiver module having an outer package design which occupies as little circuit card surface area as possible. One of the problems with such designs, however, is the fact that many modules are often required to be utilized in such devices and transceiver systems. In scenarios in which a variety of modules are placed in close proximity to one another, this presents additional difficulties.

Based on the foregoing, the present inventors have concluded that a need exists for a pluggable module that can be efficiently plugged into and removed from transceiver systems that require the use of a number of closely packed modules. The present invention thus meets and addresses this need.

BRIEF SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

It is therefore one aspect of the present invention to provide an improved transceiver module.

It is therefore another aspect of the present invention to provide an improved pluggable module for use in transceiver and other systems.

It is another aspect of the present invention to provide a method and system for releasing a module from a transceiver system that includes a plurality of modules in proximity to one another.

It is yet another aspect of the present invention to provide a pluggable module having an ejector button formed from molded plastic or other rigid material.

It is still another aspect of the present invention to provide a pluggable module having a release handle, which can be formed from wire.

The above and other aspects are achieved as is now described. A method and system is disclosed for releasing a module utilized in a transceiver system that includes a plurality of modules in close proximity with one another. The module is generally configured to include a handle with an associated cam formed in a first section of the module. The handle can be pulled in a downward (or upward) direction to allow the cam to move an associated ejector button integrated with the module in order to release the module from the transceiver system, thereby permitting the module to be efficiently removed from the transceiver system.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 10 illustrates a sectional view of a pluggable module having a handle thereof in a downward position, in accordance with a preferred embodiment of the present invention.

DETAILED DESCRIPTION OF THE PREFERRED EMBODIMENTS

The particular values and configurations discussed in these non-limiting examples can be varied and are cited merely to illustrate embodiments of the present invention and are not intended to limit the scope of the invention.

Figure 2:
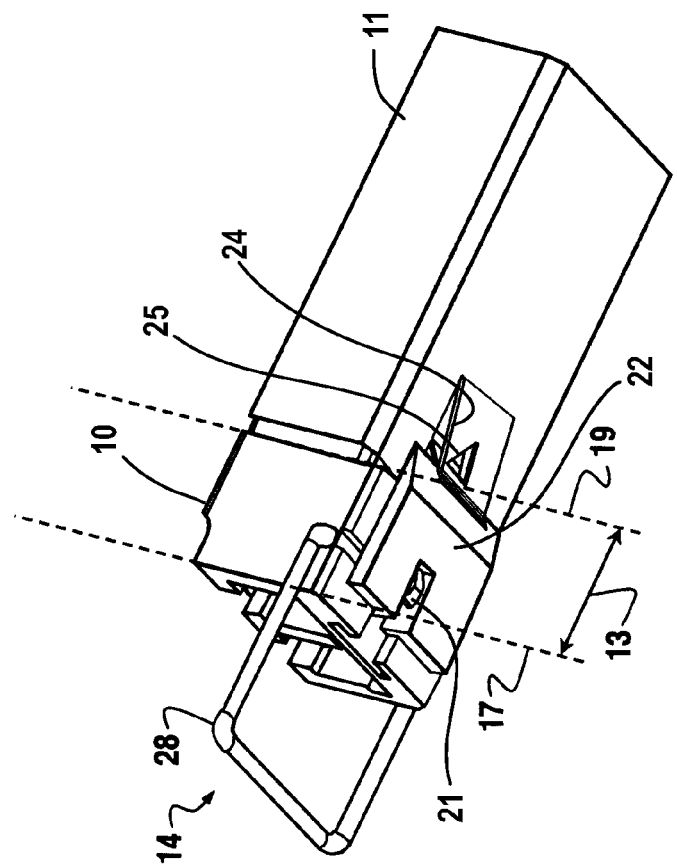
FIG. 2 illustrates a perspective pictorial view of a pluggable module having a handle thereof in a downward position, in accordance with a preferred embodiment of the present invention.
Figure 1:
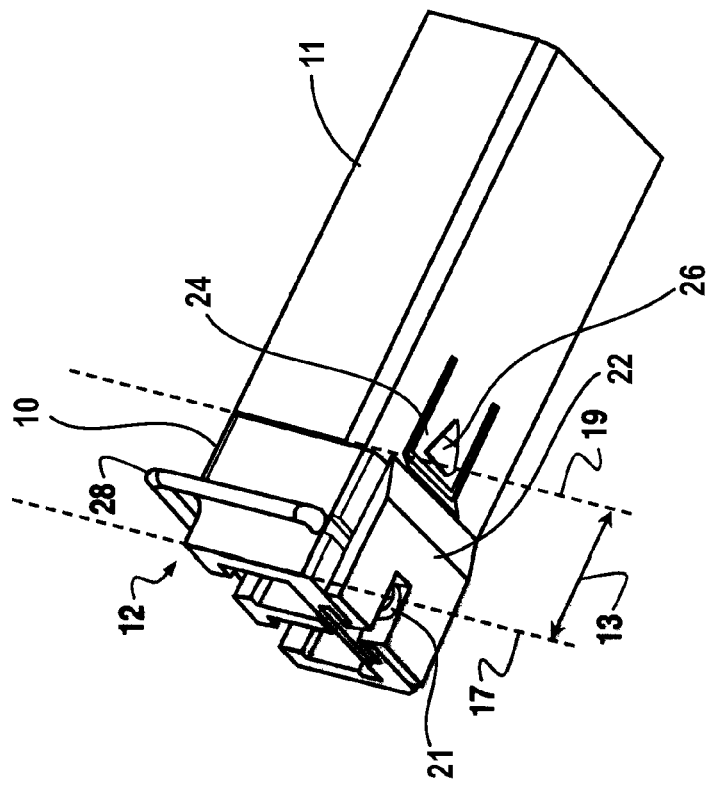
FIG. 1 depicts a perspective pictorial view of a pluggable module having a handle thereof in an upward position, in accordance with a preferred embodiment of the present invention.

FIG. 1 depicts a perspective view of a pluggable module 10 having a lever portion, which in an illustrated embodiment is formed as a handle 28 and is positioned in an upward position 12, in accordance with a preferred embodiment of the present invention. Pluggable module 10 can thus be generally configured to include a handle 28 with an associated cam 21 formed in a first section 13 of pluggable module 10. First section 13 is illustrated in FIG. 1 and 2 between dashed lines 17 and 19. Handle 28 can be pulled in a downward direction to allow a substantially lateral or sliding movement of an associated ejector button 22 (i.e., illustrated in FIGS. 6 and 10) integrated with pluggable module 10 in order to release pluggable module 10 from the transceiver system cage 11. While other shapes and configurations could be used, as is shown in the illustrated embodiment, the ejector button 22 is configured with an end having a substantially tapered shape so as to have a wedge-like shape. As is discussed in further detail, this wedge shape provides a surface that allows the ejector button 22, when slidably/laterally moved to the positions shown in FIGS. 2, 8 and 10, to disengage the pluggable module 10 from the transceiver system cage 11. Moreover, once disengaged, the module 10 can be removed from the cage 11 via the handle 28; a pulling force applied to the handle 28 slidably removes the module from the cage.

Pluggable module 10 can thus be removed from the transceiver system cage 11 utilizing handle 28. Pluggable module 10 is locked into the transceiver system when handle 28 is placed in an upward position 12, as illustrated in FIG. 1. Handle 28 may be configured from a wire handle, which can be formed from steel wire or other rigid or semi-rigid material. The ejector button 22 (i.e., see FIGS. 6 and 10) may be configured from molded plastic or other rigid or semi-rigid material. FIG. 2 illustrates a perspective view of pluggable module 10 having handle 28 thereof in a downward position 14, in accordance with a preferred embodiment of the present invention.

Figure 3:
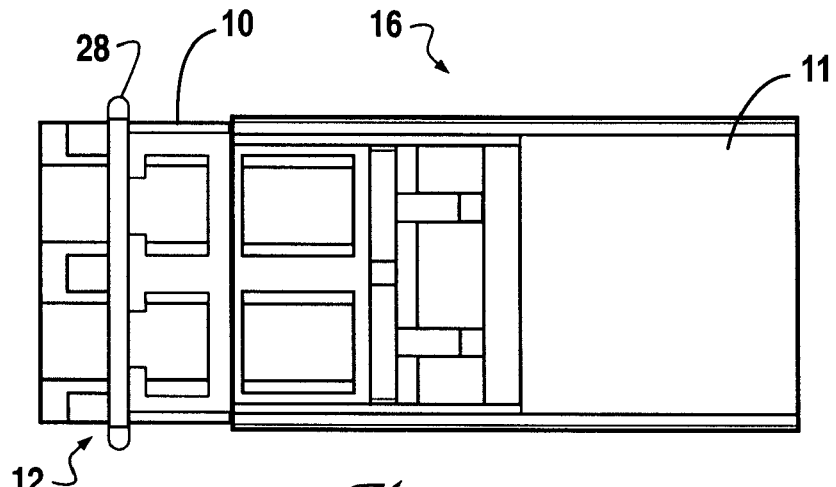
FIG. 3 depicts a top view of a pluggable module having a handle thereof in an upward position, in accordance with a preferred embodiment of the present invention.
Figure 4:
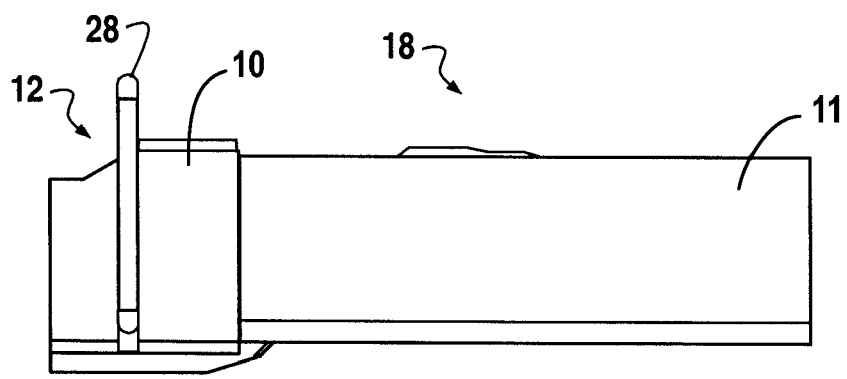
FIG. 4 illustrates a side view of a pluggable module having a handle thereof in an upward position, in accordance with a preferred embodiment of the present invention.
Figure 5:
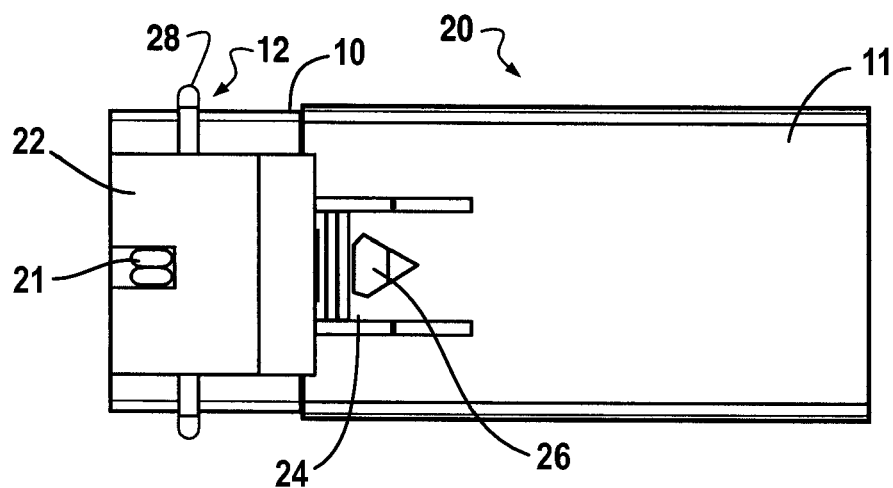
FIG. 5 depicts a bottom view of a pluggable module having a handle thereof in an upward position, in accordance with a preferred embodiment of the present invention.
Figure 6:
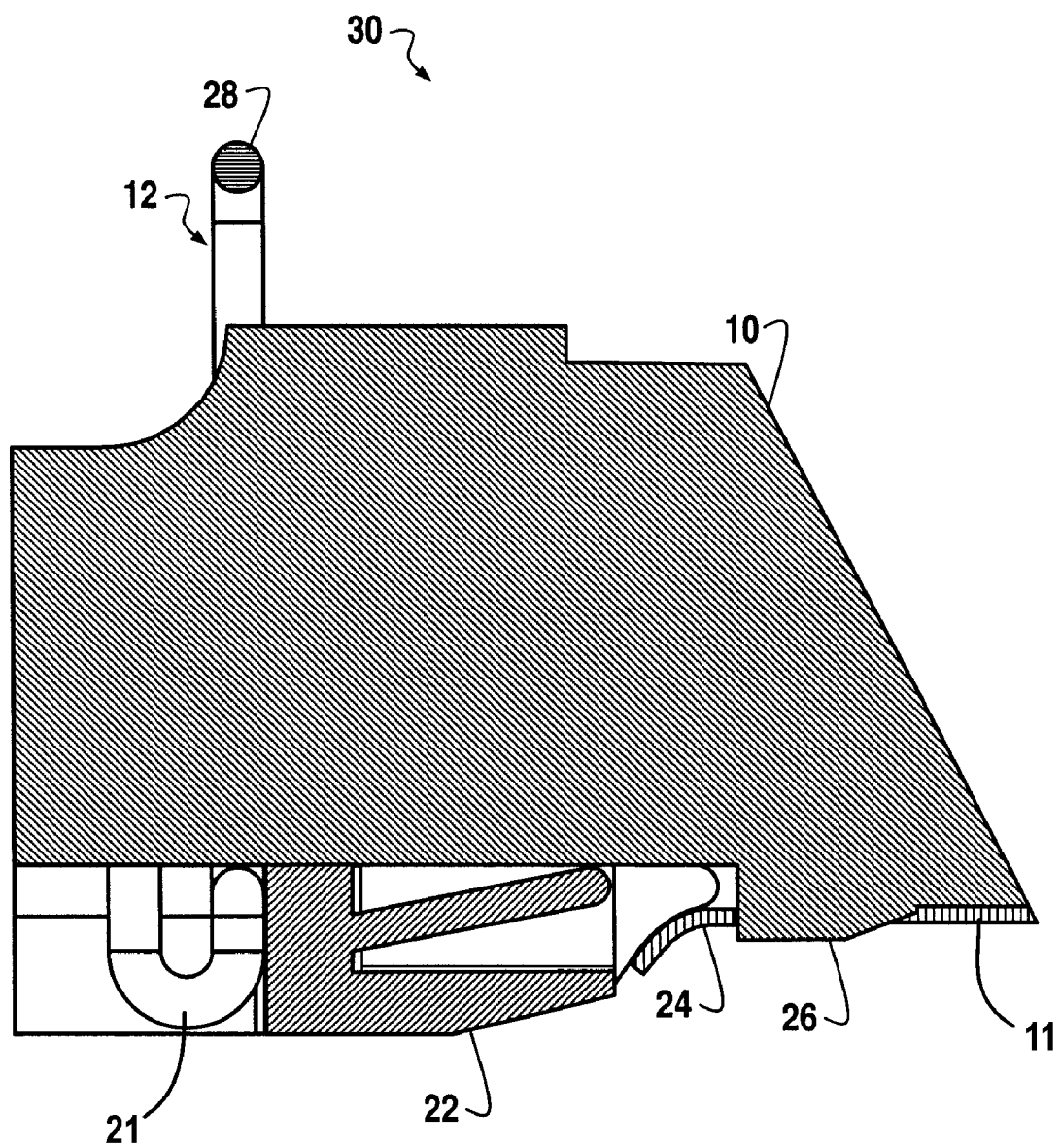
FIG. 6 illustrates a sectional view of a pluggable module having a handle thereof in an upward position, in accordance with a preferred embodiment of the present invention.

Note that in FIGS. 1 to 10, analogous or like parts are indicated by identical reference numerals. Thus, FIGS. 1 to 10 are jointly illustrated herein to provide varying views of pluggable module 10. FIG. 3 depicts a top view 16 of pluggable module 10 having handle 2.8 thereof in an upward position 12, in accordance with a preferred embodiment of the present invention. FIG. 4 illustrates a side view 18 of pluggable module 10 having handle 28 thereof in an upward position 12, in accordance with a preferred embodiment of the present invention. FIG. 5 depicts a bottom view 20 of pluggable module 10 having handle 28 thereof in an upward position 12, in accordance with a preferred embodiment of the present invention. FIG. 6 illustrates a sectional view 30 of pluggable module 10 having handle 28 thereof in an upward position 12, in accordance with a preferred embodiment of the present invention. Sectional view 30 of FIG. 6 additionally illustrates an ejector button 22, a locking tab 24 and recess 25 positioned on a cage 11 that receives the pluggable module 10 and its corresponding locking member or tab 26 disposed thereon.

Figure 7:
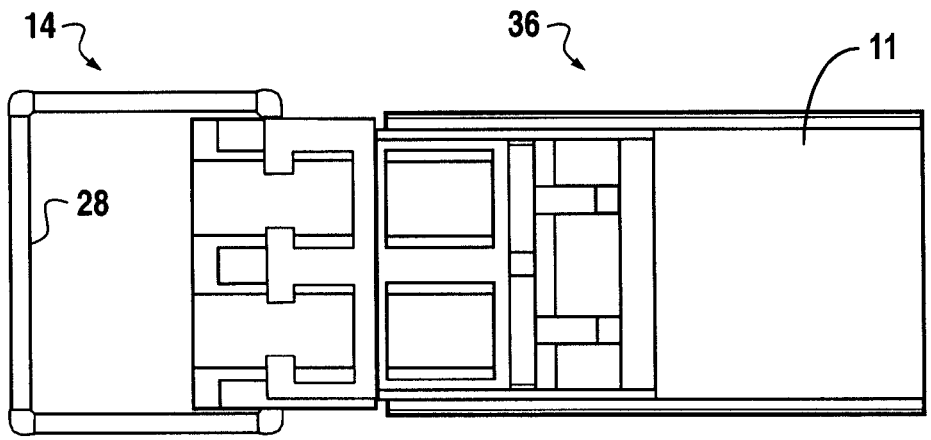
FIG. 7 depicts a top view of a pluggable module having a handle thereof in a downward position, in accordance with a preferred embodiment of the present invention.
Figure 8:
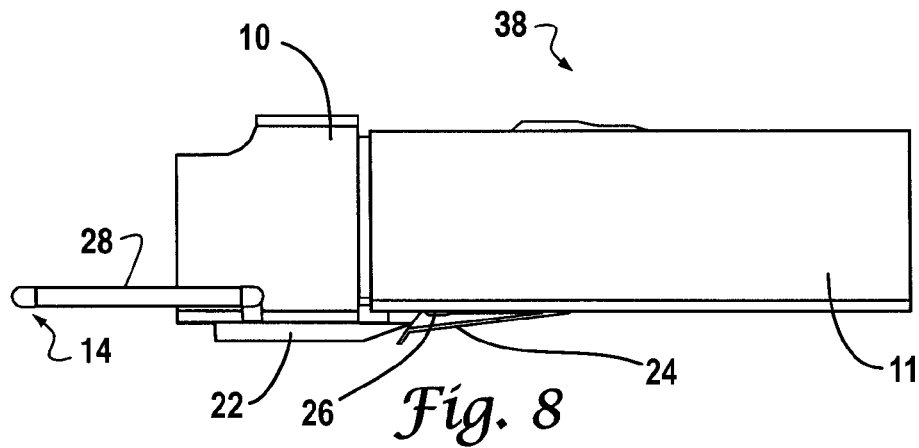
FIG. 8 illustrates a side view of a pluggable module having a handle thereof in a downward position, in accordance with a preferred embodiment of the present invention.
Figure 9:
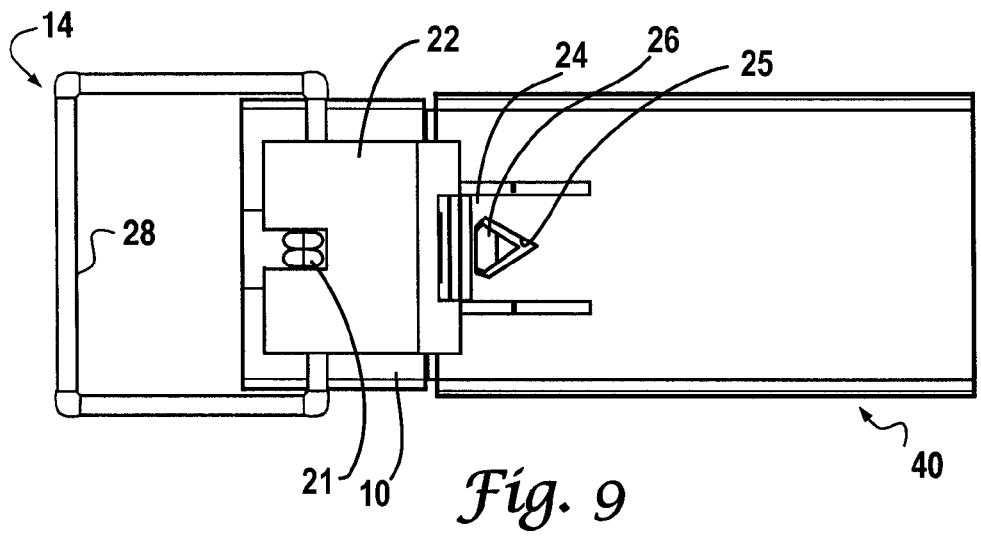
FIG. 9 depicts a bottom view of a pluggable module having a handle thereof in a downward position, in accordance with a preferred embodiment of the present invention.

FIG. 7 depicts a top view 36 of pluggable module 10 having a handle thereof in a downward position 14, in accordance with a preferred embodiment of the present invention. FIG. 8 illustrates a side view 38 of pluggable module 10 having handle 28 thereof in a downward position 14, in accordance with a preferred embodiment of the present invention. FIG. 9 depicts a bottom view 40 of pluggable module 10 having handle 28 thereof in a downward position 14, in accordance with a preferred embodiment of the present invention.

FIG. 10 illustrates a sectional view 40 of pluggable 10 module having handle 28 thereof in a downward position 14, in accordance with a preferred embodiment of the present invention. The method and system for removing a module, such as pluggable module 10, as indicated herein, thus utilizes a small wire handle 28 with a cam 21 formed in one section and a modified ejector button 22. When handle 28 is placed in an upward position 12 as indicated, for example, in FIG. 6 the module is locked into place, by virtue of the locking member or tab 26 being disposed within the recess 25 of the locking tab 24 portion of the cage. When the handle is pulled down, the cam 21 moves the ejector button 22, which releases the module, as is shown in FIG. 10, by displacing the locking tab 24 portion of the cage, thereby disengaging the locking member or tab 26 portion of the module 10 from the recess 25. Handle 28 can then be utilized to pull the module away from the transceiver system cage 11 or other associated system into which it was previously plugged.

Pluggable module 10 can be configured as a transceiver module for use in a transceiver system or associated systems thereof Such a transceiver module may be configured as an optoelectronic transceiver module, such as, for example, an infrared (IR) transceiver. Pluggable module 10 can include an emitter (not illustrated), which can be configured from a small laser.

Such a small laser may be, for example, a VCSEL (Vertical Cavity Surface Emitting laser). A VCSEL is a type of laser device that emits light in a single direction through an upper structure of the laser structure. VCSEL devices thus generally combine the performance advantage of LEDs and lasers at costs comparable to LED solutions. Traditional semiconductor lasers, such as the ones utilized in CO players, emit light from edge of the chip, so it is necessary to cleave a wafer into chips and package the chip before knowing of the laser is good. VCSELs emit light vertically from the wafer surface, like LEDs, which means their fabrication and testing is fully compatible with standard integrated circuit procedures and equipment. VCSELs, however, are much faster and more efficient and produce a smaller divergence beam than LEDs. Pluggable module 10 can thus be configured as a transceiver module based on a VCSEL laser, which produces a beam, that projects light in a collimated fashion.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention.

Many modifications and variations are possible in light of the above teaching without departing from scope of the following claims. It is contemplated that the use of the present invention can involve components having different characteristics. It is intended that the scope of the present invention be defined by the claims appended hereto, giving full cognizance to equivalents in all respects.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for releasing a module utilized in a transceiver system that includes a plurality of modules in close proximity with one another, said method comprising the steps of:
    configuring said module to include a handle with an associated cam formed along a length of the handle; and
    moving said handle in a predetermined direction to cause said cam to move in a substantially sliding fashion an associated ejector button integrated with said module in order to release said module from said transceiver system, thereby permitting said module to be removed from said transceiver system.

2. The method of claim 1 further comprising the step of:
    removing said module from said transceiver system utilizing said handle.

3. The method of claim 1 further comprising the step of:
    locking said module into said transceiver system when said handle is placed in a predetermined position.

4. The method of claim 1 wherein said handle comprises a wire handle.

5. The method of claim 4 wherein said wire handle is formed from steel wire.

6. The method of claim 1 wherein said ejector button is configured from molded plastic.

7. The method of claim 1 wherein said module comprises a pluggable module that is plugged into said transceiver system.

8. The method of claim 1 wherein said module comprises a form-factor pluggable transceiver module for use in association with said transceiver system.

9. A system for releasing a module from a transceiver system that includes a plurality of modules in close proximity with one another, said system comprising:
    said module configured to include a handle formed from a contiguous wire portion having associated cam formed integrally along a length of the wire handle; and
    wherein said handle is moveable in a direction to allow said cam to slidably move an associated ejector button integrated with said module in order to release said module from said transceiver system, thereby permitting said module to be removed from said transceiver system; and
    wherein said handle module is removable from said transceiver system utilizing said handle.

10. A pluggable transceiver module, comprising:
    a housing having a first side and a face substantially perpendicular to the first side, and a tab extending beyond the surface of the first side, and the tab sized to mate with a slot in a receptacle of a host device for receiving the pluggable transceiver module housing;
    a member slidably mounted to the first side of the housing and having an internal end and an external end;
    a wedge on the internal end of the member, wherein sliding the member inward causes the wedge to slide between the tab and the slot on the receptacle and remove the tab from within the slot, thereby releasing the pluggable transceiver module from the receptacle; and
    a lever rotatably mounted via an axle proximate to the face of the pluggable transceiver module, said axle be connected to the external end of the member such that rotating the lever away from the face of the pluggable transceiver cause the rotating axle to push the member inward and drive the wedge between the tab and the slot in order to release the pluggable transceiver module from the receptacle.

11. The pluggable transceiver of claim 10, further comprising:
    a cross-bar on a free end of the lever.

12. The pluggable transceiver of claim 11, further comprising:
    a ridge on and parallel to the cross-bar.

13. The pluggable transceiver module of claim 10, wherein the lever is pulled away from the face of the pluggable transceiver module in order to release the pluggable transceiver module from a receptacle.

14. The pluggable transceiver module of claim 10, further comprising:
    a receptacle for receiving the pluggable transceiver module, the receptacle having a base including the slot for receiving the tab, whereby the first side of the pluggable transceiver module slides along the base during insertion of the pluggable transceiver module into the receptacle, and the tab enters the slot in order to secure the pluggable transceiver module within the receptacle.

15. The pluggable transceiver module of claim 10, wherein the tab is triangular in shape.

16. The pluggable transceiver module of claim 10, wherein the axle is connected to the external end of the member via a flexible member.

17. The pluggable transceiver module of claim 10, wherein the axle is connected to the external end of the member via a hinge.

18. The pluggable transceiver module of claim 10, wherein the axle is connected to the external end of the member via a living hinge.

19. The pluggable transceiver module of claim 10, wherein the member is slidably mounted within a slit on the first side of the pluggable transceiver module.

20. The connector module of claim 10, further comprising:
    an optical input socket and an optical output socket.

21. The connector of claim 10, wherein the member is elongated between the internal end and the external end.

22. A pluggable transceiver module and receptacle, comprising:
- a receptacle of a host device for receiving a pluggable transceiver module, the receptacle having a base including a slot for receiving a tab of a pluggable transceiver module during insertion into the receptacle;
- a pluggable transceiver module having a housing with a first side and a face perpendicular to the first side, a tab extending beyond the surface of the first side, and the tab sized to mate with the slot in the receptacle, wherein the first side of the pluggable transceiver module slides along the base during insertion of the pluggable transceiver module into the receptacle, and the tab enters the slot in order to secure the pluggable transceiver module within the receptacle;
- a member slidably mounted on the first side of the housing having an internal end and an external end;
- a wedge on the internal end of the member, wherein sliding the member causes the wedge to slide between the tab and the slot on the receptacle and remove the tab from within the slot, thereby releasing the pluggable transceiver model from the receptacle; and
- a lever rotatably mounted via an axle proximate the face of the pluggable transceiver module, said axle be connected to the external end of the member such that rotating the lever away from the face of the pluggable transceiver cause the rotating axle to push the member inward and drive the wedge between the tab and the slot in order to release the pluggable transceiver module from the receptacle.

* * * * *

UNITED STATES PATENT AND TRADEMARK OFFICE
CERTIFICATE OF CORRECTION

PATENT NO.        : 7,477,825 B2                                          Page 1 of 1
APPLICATION NO.   : 11/838145
DATED             : January 13, 2009
INVENTOR(S)       : Walker et al.

It is certified that error appears in the above-identified patent and that said Letters Patent is hereby corrected as shown below:

<u>Column 4</u>
Line 53, change "thereof Such" to --thereof. Such--

Signed and Sealed this

Fourteenth Day of September, 2010

David J. Kappos
*Director of the United States Patent and Trademark Office*